INVENTOR
JOSEPH B. ARMITAGE
BY Fred G. Parsons
ATTORNEY

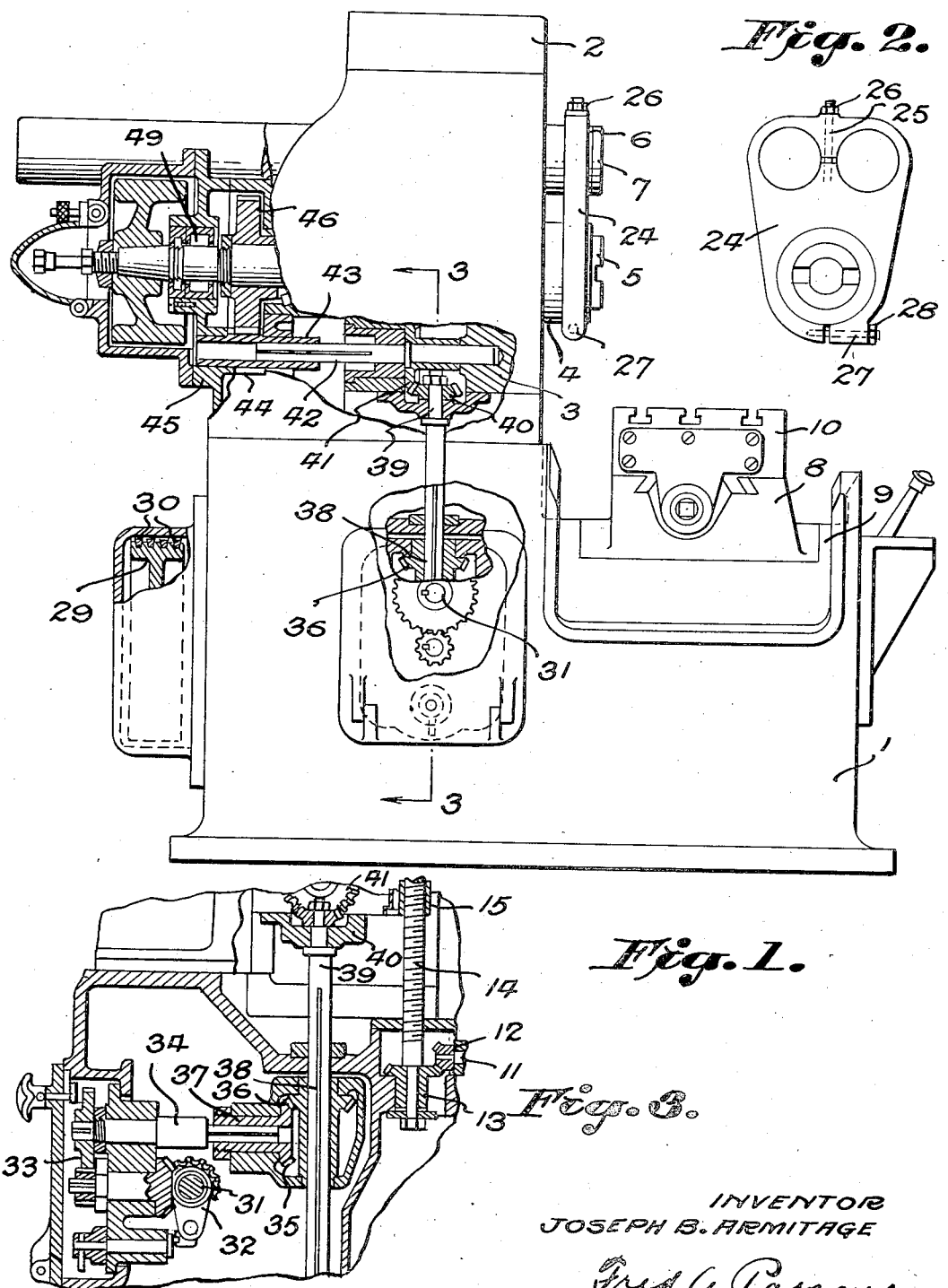

Patented Mar. 17, 1936

2,034,221

UNITED STATES PATENT OFFICE 2,034,221

MILLING MACHINE

Joseph B. Armitage, Wauwatosa, Wis., assignor to Kearney & Trecker Corporation, West Allis, Wis.

Application September 12, 1934, Serial No. 743,670

5 Claims. (Cl. 90—11)

This invention relates to milling machines and particularly to the tool spindle and the support and drive train therefor.

An object of the invention is to provide a means of journaling and driving the tool spindle of a milling machine resulting in increased rigidity and efficiency of power transmission therethrough particularly where the spindle is supported in a quill or similar structural element.

Another object of the invention is to support and drive the tool spindle of a milling machine in such manner that the strength and rigidity of the support for face milling cutters is substantially improved, particularly where the spindle is mounted in a quill or similar element.

A further object of the invention is to provide a milling machine with a tool spindle supported in a quill by anti-friction bearings of improved and simplified construction, particularly at the front or cutter end of said spindle in a manner which requires a minimum number of bearing parts and which provides for a maximum of spindle strength, a minimum of spindle overhang and a minimum of bearing diameter.

Another object is generally to improve the construction and operation of a milling machine, its tool spindle support and drive train to the cutter, particularly where the spindle is mounted in a quill or similar support, and still other objects and advantages of the invention will be apparent from the description and claims.

Similar reference characters refer to like parts throughout the specification, in which:

Fig. 1 is a left side elevation of a milling machine, partly in section, wherein the invention is incorporated.

Fig. 2 is a front elevation of a member connecting the spindle quill to the overarm structure of the milling machine shown in Fig. 1.

Fig. 3 is a partial vertical section taken along the line 3—3 of Fig. 1.

Figure 4:
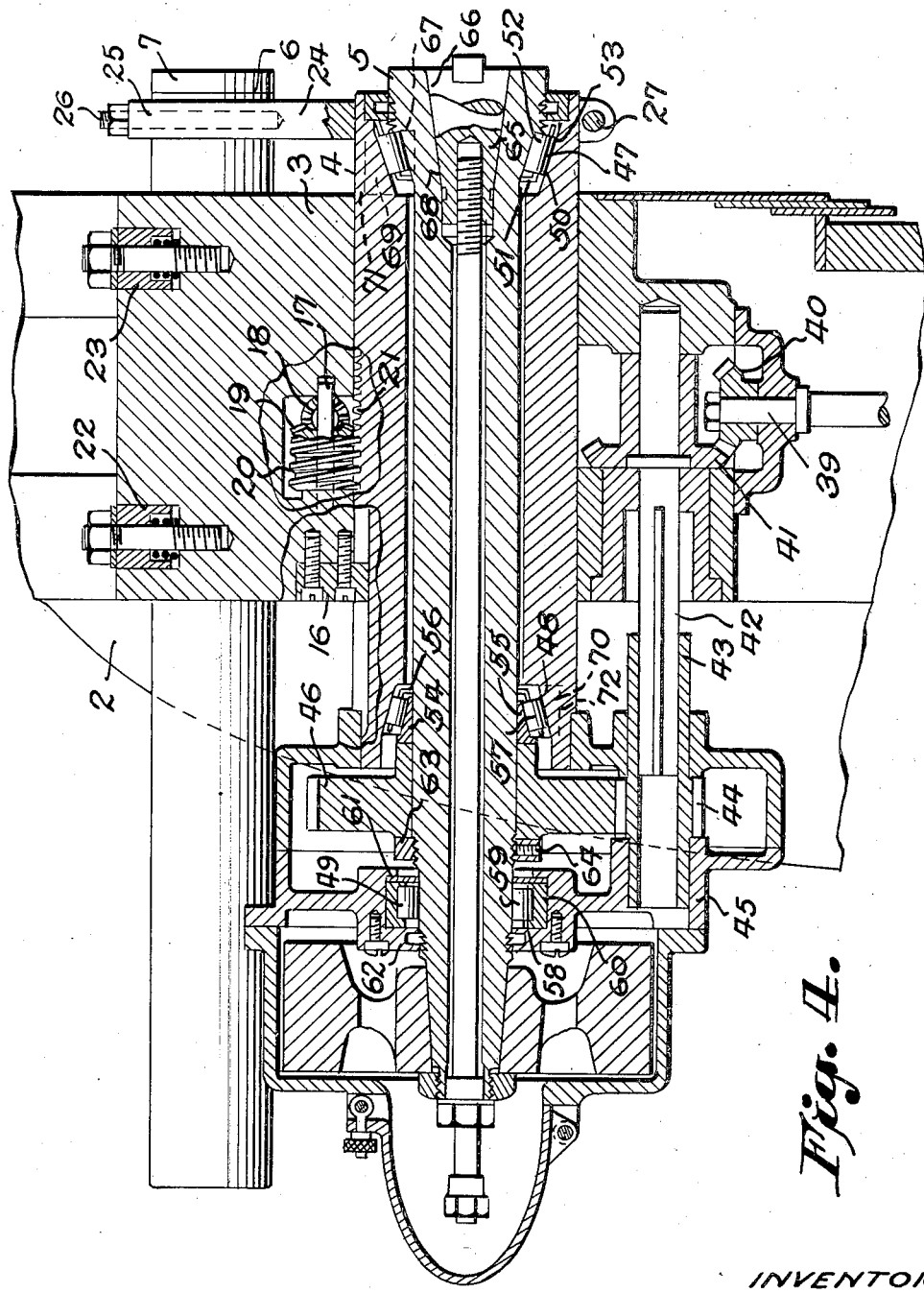
Fig. 4 is an enlarged partial vertical section taken along the axis of the tool spindle of the milling machine shown in Fig. 1.

The machine shown in Fig. 1 is similar in many respects with that shown in Patent No. 1,967,733, issued July 24, 1934, and will, therefore, be only briefly described as to those matters which are not pertinent to the present invention.

The machine as shown in Fig. 1 comprises a bed or base 1 having fixed or integral therewith an upstanding spindle supporting column portion 2, which carries a vertically adjustable spindle carrier 3 in which a quill member 4 is horizontally adjustable. A tool spindle 5 is rotatably journaled in quill 4, axially parallel with the path of quill adjustment and overarms 6 and 7 are guided by the carrier 3 for adjustment in a direction parallel with the spindle axis. Bed 1 also supports a saddle or table support 8 fixed in a suitable recess 9 and a work support table 10 for reciprocation in a horizontal plane transverse to the axis of spindle 5.

Carrier 3 is vertically adjustable by the means of a hand crank, not shown, on the shaft 11, Fig. 3, which rotates bevel gears 12 and 13 and an elevating screw 14 threadedly engaged with a nut member 15. The carrier may be clamped in any position of vertical adjustment by suitable clamps, not shown. Quill 4, Fig. 4, is guided for adjustment in carrier 3 in a direction parallel with the axis of spindle 5 and is keyed to the carrier by a key 16. The quill may be adjusted by a hand crank, not shown, on a shaft 17 which rotates bevel gears 18 and 19 and a worm 20 meshing with suitable rack teeth 21 on the quill. The quill may be clamped rigidly in any position of adjustment by any suitable clamps, not shown. The overarms 6, 7 may be manually shifted and may each be clamped rigidly in any position of adjustment by suitable clamps, shown in part at 22, 23, Fig. 4.

For the rigid support of the overhanging front end of quill 3 in any position of adjustment thereof, there is provided a member 24, Figs. 1, 2, 4, having clamp means as shown in Fig. 2 including a stud 25 and a nut 26 for clamping the member rigidly with overarms 6 and 7 and other clamp means including a stud 27 and nut 28 for rigidly clamping the member to quill 4. When the member is clamped both to the quill 4 and to overarms 6, 7 the manual means for adjusting the quill is operative also for the adjustment of the overarms.

A transmission, not shown, together with suitable control mechanism therefor is provided for the movement of table 10 past the spindle 5. Such transmission and control mechanism may be in the general form shown in said Patent 1,967,733, or of any suitable form.

A motor, not shown, mounted within the bed 1 drives a pulley 29 through a plurality of V-belts 30, and provides a power source for rotating spindle 5 as follows: Pulley 29 drives a shaft 31, Figs. 1, 3, through a clutch, not shown, which drives a bevel gear reverser mechanism generally denoted by numeral 32, and a rate changer generally denoted by numeral 33. Rate changer 33 drives a shaft 34, bevel gears 35 and 36 having sleeves 37 and 38, a vertical shaft 39, bevel gears 40 and 41 mounted in carrier 3, and a shaft 42 which is slidably keyed within an elongated sleeve 43 having fixed therewith a gear 44 and journaled in a housing 45 fixed with quill 4 for bodily adjustment therewith. Gear 44 drives spindle 5 through the gear 46.

Spindle 5 is rotatably journaled in quill member 4 and housing 45 carried thereby by anti-friction bearings as follows: A front bearing, generally denoted by the numeral 47, Fig. 4, located at the front end of spindle 5 adjacent to the table 10, restrains spindle 5 against both lateral and rearward axial movement relative to quill 4, an intermediate bearing generally denoted by the numeral 48 restrains the spindle 5 against both lateral movement and forward axial movement, and a rear bearing generally denoted by the numeral 49 restrains the rear end of the spindle against lateral movement.

Front bearing 47 includes tapered or conically shaped rollers 50 separated by a spacer or cage 51 and running on an inner conical surface or race 52 formed integrally with spindle 5 and positioned at a point closely adjacent to the front or cutter end of the spindle, and an outer conical surface or race 53 formed integrally with quill member 4 and positioned closely adjacent the front end of quill 4. The arrangement is such that rearward axial movement of the spindle relative to the quill takes up any slack or lost motion in the bearing and is eventually arrested by the quill member. Intermediate bearing 48 includes an inner conical race or cone member 54 closely but slibably fitted upon spindle 5, a plurality of tapered or conically shaped rollers 55, a spacer or cage 56 and an outer conical surface or race 57 made integral with quill member 4. Rear bearing 49 includes a plurality of cylindrical rollers 58 running on an inner race 59 which is formed integrally with spindle 5, and an outer race member 60 positioned between a shoulder 61 of housing 45 and a bearing cap 62.

The arrangement of the bearings just described is such that when the race member 54 is moved forwardly, relative to spindle 5 any slack or lost motion in both the front bearing 47 and the intermediate bearing 48 is removed and the spindle 5 is rigidly fixed in position relative to quill 4, both axially and laterally. For adjusting the inner race 54 there is provided a nut 63 threadedly engaging spindle 5 and provided with a lock screw 64, the elongated hub of gear 46 providing a thrust member between the nut 63 and race member 54.

In some of the normal operations on a milling machine the cutters are mounted upon a cutter arbor having a tapered or conical end portion 65 socketed in the front end of the spindle as shown in Fig. 4. The socket required for such arbors is in the form of a relatively large tapered axial bore 66, which extends some distance into the spindle to provide sufficient length of arbor bearing to accurately coaxially align the arbor and spindle. It is partly by reason of this construction that the inner race 52 is made integral with the spindle 5, for it is readily apparent that if a separate inner race member were used, such, for instance, as is indicated in dotted lines at 67, Fig. 4, the spindle would be materially thinner and weaker at the point 68. Similarly, the outer races 53 and 57 are made integral with quill 4 partly in order to avoid weakening the quill. If separate outer race members were used, as for instance indicated by the dotted lines 69 and 70, the quill would be materially weakened at the points 71 and 72 respectively. Also as to each of the front, rear and intermediate bearings the elimination of separate race members acts to reduce the number of joints between the spindle and its support and thereby greatly increases the simplicity and rigidity of the support, and therefore improves and increases the effectiveness of the entire machine as a means for the removal of metal from a work piece fixed on the table. Increased rigidity of support is particularly important at the front end of the spindle, and at this point, it will be noted, all loose or extra pieces have been eliminated between the application of the cutter pressure and the support, the strains being transmitted directly from the one to the other of the main elements of the cutter support. The member 24 is of particular importance in the support of the cutter when the quill 4 has been adjusted forwardly to overhang the front end of the carrier. By reason of this construction there is added to the support provided by resistance of the overhanging quill the resistance to distortion of the overarms 6, 7.

By reason of the various improved constructions the resulting transmission and support for the cutter is many times as rigid and resistant to vibration, both for lateral and torsional strains than the previous structures for similar purpose.

What is claimed is:

1. In a milling machine having a work table, the combination of a spindle support upstanding adjacent said table, a non-rotatable spindle quill carried by said spindle support, a tool spindle rotatably supported from said quill and having an exposed end adjacent said table and providing an arbor socket, said spindle and quill being bodily unitarily adjustable relative to said column in the direction of the axis of said spindle, bearings for said spindle including an anti-friction bearing supported from said quill at said end adjacent said table and providing a conical inner bearing race integrally formed with said spindle at a point axially exterior to said socket and of decreasing diameter in the direction of the other end of said spindle, an outer conical bearing race associated with said quill and a plurality of tapered roller elements interposed between said races, said bearing being adapted to prevent at least one direction of axial movement of said spindle relative to said quill, means adapted to restrain said spindle and quill in relative position to establish mutually reacting pressures between said races through said elements, and power means for rotating said spindle including a rate changer, and a gear co-axial with said spindle and adapted to drive the spindle in any position of said bodily axial adjustment.

2. In a milling machine having a work table, the combination of a spindle support upstanding adjacent said table, a non-rotatable spindle quill carried by said spindle support, a tool spindle rotatably supported from said quill and having an exposed front end adjacent said table and providing an arbor socket, said spindle and quill being bodily and unitarily adjustable relative to said column in the direction of the axis of said spindle, a cutter arbor seated in said socket for coaxial rotation with said spindle, said socket extending within said spindle for a sufficient length to accurately coaxially align said spindle and arbor, bearings for said spindle including an anti-friction bearing supported from said quill at a point axially exterior to said socket and providing a conical inner bearing race integrally formed with said spindle and of decreasing diameter in the direction of the other end of said spindle, an outer conical bearing race integrally formed with said quill and a plurality of tapered roller elements interposed between said races, said bearing being adapted to prevent at least one direction of axial movement of said spindle relative to said quill, means adapted to restrain said spindle and quill in relative position to establish mutually reacting pressures between said races and through said elements, and power means for driving said spindle including a rate changer, and a gear co-axial with the spindle and adapted to drive the spindle in any position of said bodily axial adjustment.

3. In a milling machine having a work table, the combination of a spindle support uprising adjacent said table, a non-rotatable spindle quill carried by said spindle support, a tool spindle rotatably supported from said quill and having an exposed front end adjacent said table and providing an arbor socket, said spindle and quill being bodily unitarily adjustable relative to said column in the direction of the axis of said spindle, a cutter arbor seated in said socket for coaxial rotation with said spindle, said socket extending rearwardly within said spindle for a sufficient length to accurately coaxially align said spindle and arbor, bearings for said spindle supported from said quill and including a first bearing providing a conical inner bearing race integrally formed with said spindle at a point axially exterior to said socket and of decreasing diameter in the direction of the rear end of said spindle, an outer conical bearing race integrally formed with said quill and a plurality of tapered rollers interposed between said races, and a second bearing providing a member having an inner tapered race of decreasing diameter in the direction of the front end of said spindle and slidably fitted upon said spindle, an outer tapered bearing race integrally formed with said quill and a plurality of tapered rollers interposed between said races, said bearings being adapted to prevent axial movement of said spindle in either direction relative to said quill, means for adjustment of said member whereby to establish mutually reacting pressures between the outer and inner races of each of said bearings through the tapered rollers thereof, and power means for driving said spindle including a rate changer, and a gear co-axial with said spindle and adapted to drive the spindle in any position of said bodily adjustment.

4. In a milling machine having a work table, the combination of a spindle support uprising adjacent said table, a spindle quill carried by said spindle support, a tool spindle rotatably supported from said quill and having an exposed front end adjacent said table and providing a rearwardly tapered conical bore for socketing an arbor, said spindle and quill being bodily unitarily adjustable relative to said spindle support in the direction of the axis of said spindle, a cutter arbor seated in said socket for coaxial rotation with said spindle, said socket extending rearwardly within said spindle for a sufficient length to accurately coaxially align said spindle and arbor, bearings for said spindle supported from said quill and including a first bearing having an inner race formed integrally with said spindle, an outer race formed integrally with said quill and a plurality of anti-friction elements interposed between said races, and a second bearing spaced axially to the rear of said first bearing and including a member having an inner race and slidably fitted upon said spindle, an outer race formed integrally with said quill and a plurality of anti-friction elements interposed between said races, means for adjusting said member, and a transmission for driving said spindle including a rate changer and a gear, said gear being keyed to said spindle at a point axially positioned outside said bearings and adjacent said second bearing.

5. In a milling machine having a work table, the combination of a spindle support upstanding adjacent said table, a spindle quill carried by said spindle support, a tool spindle supported from said quill and having an exposed end adjacent said table and providing an arbor socket, said spindle and quill being bodily unitarily adjustable relative to said column in the direction of the axis of said spindle, bearings of said spindle including an anti-friction bearing supported from said quill at said end adjacent said table and providing an inner race formed integrally with said spindle, an outer race formed integrally with said quill and a plurality of anti-friction elements interposed between said races, said bearing being adapted to restrain said spindle against movement relative to said quill in at least one axial direction, means adapted to establish mutually reacting pressures between said races through said anti-friction elements, an overarm structure adjustably fixed with said spindle support to project adjacent said exposed spindle end, and support means simultaneously engaging the projecting portion of said overarm structure and the end of said quill adjacent said exposed spindle whereby to transmit directly to said overarm structure any strains tending to displace said projecting spindle end.

JOSEPH B. ARMITAGE.